US005118303A

United States Patent [19]

LeBaron et al.

[11] Patent Number: 5,118,303

[45] Date of Patent: Jun. 2, 1992

[54] HERMAPHRODITIC COUPLER

[75] Inventors: James B. LeBaron, Sidney; David O. Gallusser, Oneonta, both of N.Y.

[73] Assignee: Amphenol Corporation, Wallingford, Conn.

[21] Appl. No.: 657,947

[22] Filed: Feb. 21, 1991

Related U.S. Application Data

[63] Continuation of Ser. No. 502,693, Apr. 2, 1990, abandoned.

[51] Int. Cl.[5] .................... F16L 37/24; H01R 13/54

[52] U.S. Cl. .................... 439/286; 439/744; 439/290; 439/316

[58] Field of Search .............. 439/284, 286, 287, 288, 439/289, 290, 311, 314, 316, 745, 746, 750, 744

[56] References Cited

U.S. PATENT DOCUMENTS

| | | | |
|---|---|---|---|
| 2,690,542 | 9/1954 | Pearce et al. | 339/49 |
| 2,946,035 | 7/1960 | Tuchel | 439/314 |
| 3,085,138 | 4/1963 | Brown et al. | 439/750 X |
| 3,245,028 | 4/1966 | Badger | 339/90 |
| 3,245,030 | 4/1966 | D'Amico | 439/745 |
| 3,252,124 | 5/1966 | Hansen | 339/47 |
| 3,323,083 | 5/1967 | Ziegler | 333/97 |
| 4,146,288 | 3/1979 | Ramsay et al. | 439/316 |
| 4,418,946 | 12/1983 | Cambon | 439/286 |
| 4,595,251 | 6/1986 | Moulin | 339/47 R |
| 4,695,110 | 9/1987 | Wasserlein | 439/289 |

FOREIGN PATENT DOCUMENTS

| | | | |
|---|---|---|---|
| 0132099 | 1/1985 | European Pat. Off. . | |
| 2115580 | 11/1971 | Fed. Rep. of Germany . | |
| 2648287 | 4/1978 | Fed. Rep. of Germany | 439/284 |
| 8804091.7 | 7/1988 | Fed. Rep. of Germany . | |
| 1367016 | 6/1964 | France | 439/290 |

*Primary Examiner*—Larry I. Schwartz
*Assistant Examiner*—J. R. Daulton
*Attorney, Agent, or Firm*—Bacon & Thomas

[57] ABSTRACT

A hermaphroditic coupling mechanism includes two identical coupling members, each including two latch arms and two detented locking ramp surfaces. The latch arms include surfaces which face a coupler interface, while the locking ramp surfaces face away from the interface. The latch arms are inserted through grooves in a collar on which the locking ramp surfaces are provided, and the members are then rotated relative to each other causing the surfaces on the latch arms to pass over detents on the locking surfaces, thereby locking the coupling members together against relative axial movement. The coupling members may be secured to respective contacts by a snap-fit arrangement.

11 Claims, 2 Drawing Sheets

HERMAPHRODITIC COUPLER

This application is a continuation of application Ser. No. 502,693, filed Apr. 2, 1990, now abandoned.

BACKGROUND OF THE INVENTION

I. Field of the Invention

This invention relates to the field of cable coupling, and in particular to a hermaphroditic coupling mechanism for a cable contact arrangement.

II. Description of Related Art

It is known to provide electrical cables with contacts which may be easily fitted together in order to electrically connect the cables. An example of an especially convenient cable contact is the "pin and socket" contact. The pin and socket contact permits connection of two cables by simply sliding a pin on one cable into a socket on the other. One type of widely used pin and socket contact, is the "twinax" contact which is used to connect cables carrying two electrical wires surrounded by a common jacket.

Because it is desirable to design such contacts to be as simple as possible, many of the conventional pin and socket contact arrangements lack any sort of latching mechanism. This is completely satisfactory for uses in which no strain is placed on the cables in a direction which would cause the contacts to be pulled apart. However, for many applications, some type of latching mechanism is required in order to prevent the contacts from pulling apart. The most common means of providing this latching mechanism is by trapping the contact inside an elaborate connector. The connector then provides the mating and unmating mechanism as well as the latching mechanism.

While specially designed contacts are known which include a strain relief or latching mechanism, there is a need for a strain relief or latching mechanism which may be retrofitted onto conventional pin and socket contacts of the type which do not include a latch.

Most conventional coupling mechanisms use asymmetrical "male" and "female" coupling members. However, use of male and female coupling members doubles the number of different parts required, and may cause problems due to the impossibility of coupling members of the same sex.

In order to solve the problems inherent in using sexed couplers or connectors, hermaphroditic or sexless coupling mechanisms are known. Nevertheless, hermaphroditic coupling mechanisms which may be easily retrofitted onto conventional contacts have so far not been developed, thus limiting application of the known hermaphroditic couplers.

SUMMARY OF THE INVENTION

It is an object of the invention to provide a releasable hermaphroditic coupling mechanism which can be easily retrofitted onto a conventional cable contact arrangement without modifying the contacts.

It is a further object of the invention to provide such a releaseable hermaphroditic coupling mechanism for a twinax cable contact.

It is a still further object of the invention to provide a releasable hermaphroditic coupling mechanism which is easily coupled and released, and yet nevertheless provides an especially secure coupling.

It is yet another object of the invention to provide a hermaphroditic coupling mechanism which may be environmentally sealed against moisture penetration both at the rear of the mechanism and at the interface between contacts.

Finally, it is an object of the invention to provide a method of releasably coupling cables by using a hermaphroditic coupling mechanism.

These objects are achieved by providing a coupling mechanism which includes two identical coupling members, each of which includes a latching arm provided with a latch arm ramp surface which faces an interface portion of the coupler member, and a complimentary locking ramp surface which faces away from the interface portion of the coupler.

The locking ramp surface includes a detent over which the latch arm ramp surface passes when the coupler members are rotated relative to each other, the detent thereafter holding the latch arm ramp surface relative to the locking ramp surface in order to secure the couplers together. The locking ramp surface is provided on a collar which extends around the coupler member and which includes a groove through which the latching arm is inserted prior to relative rotation of the couplers.

The coupling members are easily retrofitted onto respective contacts by a ramp and detent mechanism provided in an inner bore of the coupler. The contact is inserted into the bore until a collar on the contact passes over the detent and is retained thereby.

DETAILED DESCRIPTION OF THE PREFERRED EMBODIMENT

Figure 1:
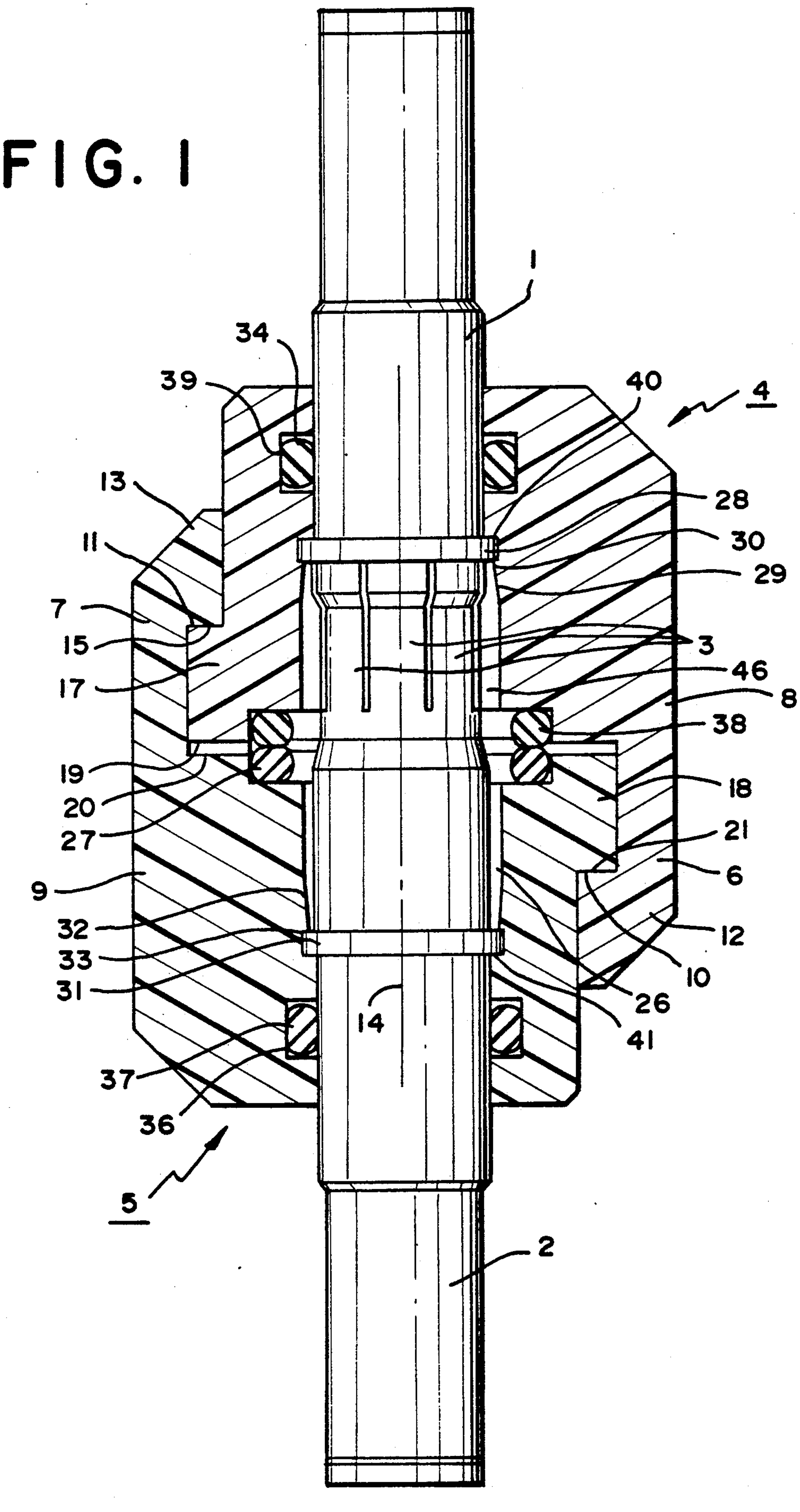
FIG. 1 is a cross-sectional view of a mated coupler and twinax contact pair according to a preferred embodiment of the invention.
Figure 2:
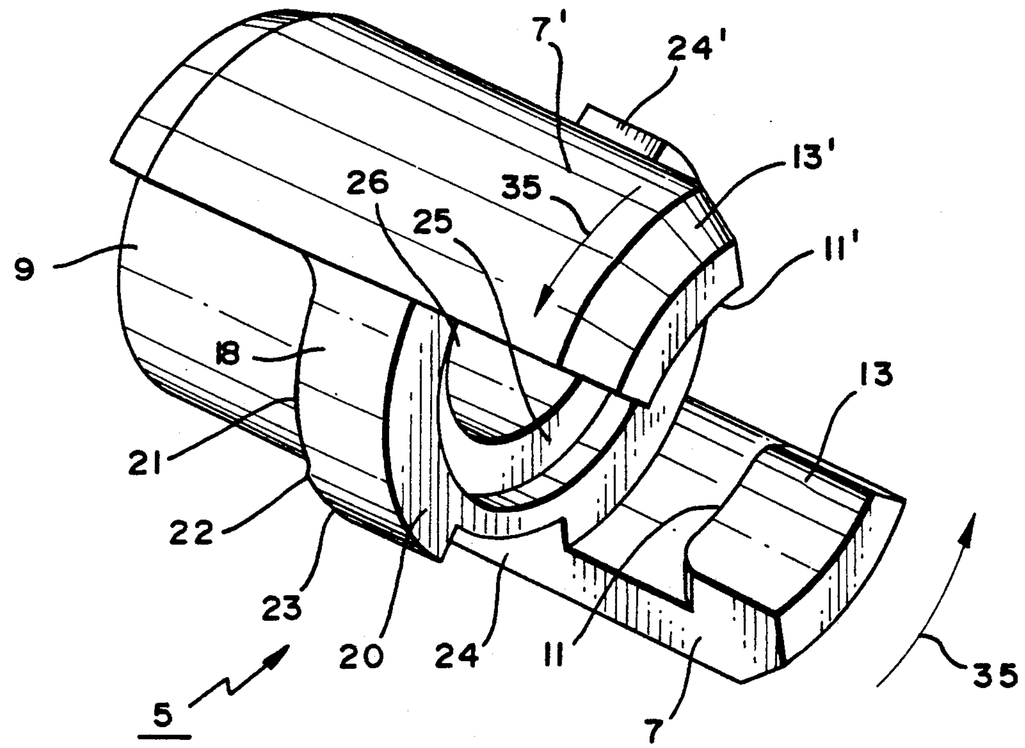
FIG. 2 is an isometric view of one of the couplers of the pair shown in FIG. 1.

FIGS. 1 and 2 illustrate a coupling mechanism for coupling two cable contacts and locking them against disengagement according to a preferred embodiment of the invention. Although the contacts illustrated are "twinax" contacts, one of which is a pin and the other a socket, it will be appreciated that any of a large variety of cable contacts, including power, coaxial and triaxial contacts, may be used with the coupler mechanism of the invention.

In the particular example shown, twinax contact pin 1 slides into twinax contact socket 2 to effect an electrical connection between two twin axial cables (not shown). The manner in which the contacts are connected to the cables is conventional and forms no part of the invention.

Without some kind of latching mechanism, the pin 1 and socket 2 would be free to disengage from each other because they do not include an internal latching mechanism, other than the resilience of the tines 3 which form part of socket 2. The coupler mechanism of the invention is intended to prevent such disengagement, and may be used with any contact mechanism which might otherwise be disengageable under tension.

FIG. 2 is a perspective view of coupling member 5, which is identical in structure to coupling member 4. Coupling member 5 is generally cylindrical in shape, the axis of the cylinder coinciding with principal axis 14 of the two contacts 1 and 2 as shown in FIG. 1.

The coupling member shown in FIG. 2 includes two latch arms extending from a main body 9 of the coupling member, and two locking ramp surfaces provided on a collar 18 which extends generally around main body 9. Because the coupling member has a 180 degree mirror symmetry, i.e., the coupler member will always appear identical when rotated 180 degrees, only one of the latch arms and one of the locking arms ramps is described in detail. Elements having primed reference numerals (e.g., latch arm 7' and groove 24') are identical to corresponding unprimed elements (e.g., latch arm 7 and groove 24).

Latch arm 7 includes a latch arm ramp surface 11 which is engageable with a complementary ramp surface 21 on the corresponding mating coupling member 4 and which faces an interface portion 20 of coupler member 5. Interface 20 is an annular surface surrounding the bore 26 through which the contacts are inserted. Ramp surface 11 is provided on a radially inward extending projection 13 at the distal end of latch arm 7. A corresponding latch arm 6 including projection 12 and ramp surface 10 is provided on coupler member 4 and is engageable with ramp surface 21 on coupler member 5.

Interface surface 20 faces a corresponding interface surface 19 when the two coupling members 4 and 5 are joined as shown in FIG. 1. Although illustrated as being slightly apart after coupling, it is also contemplated that the coupling members may contact each other, or contact each other during coupling and then separate.

Locking ramp surface 21 faces away from interface surface 20 and is provided on collar 18, best shown in FIG. 2. A detent 22 on each of the ramp surfaces provides the means by which coupled coupler member 4 and 5 are coupled, as will be described in more detail below.

Collar 18 includes a latch bypass groove 24 which permits corresponding projection 12 of latch arm 6 on coupler member 4 to be inserted through the collar. Groove 24 must be wide enough to permit passage of the corresponding latch arm 6 and ramp 10 on the mating coupling member 4, and must be positioned such that complementary locking latches will not interfere with each other when the coupling members 4 and 5 are united.

It will be understood that collar 18 extends around main body 9 and therefore includes a second, mirror symmetric, groove 24', and that coupler member 4 is provided with identical grooves provided in collar 17.

In order to provide for the greatest mechanical advantage during coupling, it is preferred that bypass groove 24 be located adjacent a locking latch arm as shown. However, this is not essential as long as it is possible for the corresponding latch arm 6 on coupler 4 to bypass collar 18 and engage locking ramp surface 21 provided on the collar.

Ramp surface 21 generally slopes away from the mating interface in the direction in which the corresponding coupling member 4 will be turned during the latching process. For the purpose of simplifying this discussion, the locking direction for member 5 shall be counter-clockwise as indicated by arrows 35, although a clockwise locking direction could easily be obtained by locating bypass groove 24 adjacent the other of the locking latches 7' and by sloping the ramp surface 11 in a direction opposite the direction shown.

The leading edge of locking ramp surface 21 ends in detent 22, which is formed by surface 23, a short portion of ramp surface 21 raised in the axial direction, away from the interface surface 20 located adjacent to the clockwise edge of groove 24. Detent 22 is designed so that latch arm ramp surface 10 on latch arm 6 of member 4 will pass over the detent and engage ramp surface 21 upon coupling, detent 22 preventing backwards rotational movement of member 4 upon engagement. The operation of the coupling mechanism will be described more fully below.

In order to prevent moisture and dust infiltration into the assembly upon coupling, interface surfaces 19 and 20 between the coupling members 4 and 5 preferably each includes a groove for retaining o-rings 38 and 27 which effect an environmental seal between the coupled unit formed by members 4 and 5. It will of course be appreciated that other environmental sealing arrangements will also occur to those skilled in the art.

If used, o-rings 38 and 27 may provide resilience in order to bias the latch arm ramp surfaces against respective locking ramp surfaces. Alternatively, the latch arms or the detents may be formed of a elastically deformable material such that the material deforms as the latching ramp surfaces ride over the detents during coupling, the restoring force of the material causing the detents to regain their shape in order to retain the latch arms in place.

In order to facilitate retrofitting onto the contacts, coupling members 4 and 5 preferably also include a contact snap retention feature. A ramp and a detent are located on the inner surface of bores 26 and 46 in each of members 4 and 5 through which the contacts are separately inserted. Contacts 1 and 2 are provided in this embodiment with annular collars 28 and 31. During separate insertion of the contacts into bore 26 and 46, the collars press against respective ramp surfaces 29 and 32, which elastically deform until the collars pass detents 30 and 33, at which time the ramps and detents are restored to their original positions, holding the collars in place against annular shoulders 40 and 41.

It will of course be understood that the contacts may be retained within the coupling members by any of a variety of suitable contact retention mechanisms, and also that retention may be obtained without any additional means provided on the members, for example by an interference fit.

Finally, in order to provide further environmental protection of the contacts, grooves 36 and 39 are provided in the main bodies 8 and 9 of each coupling member for holding seals 34 and 37, preferably o-rings, between the respective contacts and bodies to seal the rear of each coupling member.

The coupling mechanism of the preferred embodiment is operated as follows: Coupling numbers 4 and 5 are first respectively secured on pin 1 and socket 2 by inserting the respective contacts through bores 26 and 46 until collars 28 and 31 pass detents 30 and 33, which elastically deform as the collars pass the detents, after which the time the ramps and detents are restored to their original position, holding the collars in place against annular shoulders 40 and 41.

In the preferred embodiment, the respective coupling members must be inserted over the cables or secured to their contacts before the cables are connected thereto. However, by reversing the order of the ramps, detents and annular shoulders, those skilled in the art will recognize that it would then be possible to slide coupling member over contact from the leading portion of the contact rather than from the cable side of the contact, thus permitting the coupling member to be added after the contact had already been secured to the cable.

Once the coupling members have been snap-locked onto the respective contacts, they are coupled by initially aligning respective latch arms with respective grooves on the complimentary locking members. The pin and socket are slid together as the aligned latch arms are inserted through the grooves. The coupling members 4 and 5 are then rotated in a counter-clockwise direction relative to each other in the preferred embodiment, so that the latch arm ramp surfaces ride up over the groove curved surfaces, over the detents, and onto the locking ramp surfaces, at which point the coupling members are locked together preventing disengagement of the contacts.

Because of the illustrated position of the grooves, latching takes place over a rotation of approximately 75°. By making the projection smaller, the amount of rotation necessary to accomplish latching could be increased, while moving the grooves away from respective latch arms would decrease the amount of rotation necessary to accomplish latching. It will be appreciated that all of the above-mentioned variations are within the scope of the invention.

Furthermore, it would be appreciated that the provisions of two latch arms and respective locking ramps on each coupling member, while desirable, is not essential. The invention would work with a single latch arm or with, for example, three latch arms and locking ramps having a 120 degree symmetry.

In order to unlatch the coupling mechanism of the preferred embodiment, it is simply necessary to reverse the direction of rotation until the respective locking projections are aligned with respective grooves, at which time the coupling members can be pulled apart by pulling the locking projections through the respective grooves, thereby also disengaging the pin contact from the socket contact. Thus, unlatching and release of the coupling arrangement is as easily accomplished as is latching.

Although a specific embodiment of the invention has been described in detail above, it is to be understood that no part of this description should be interpreted as a limitation. Those skilled in the art will appreciate that the invention is capable of numerous modifications, alterations, and substitutions of parts without departing from the scope of the invention, which is defined solely by the appended claims.

What is claimed is:

1. A cable contact coupling arrangement for releasably latching together two cable contacts, comprising:

a first coupling member including a latch arm and a latch ramp surface on the latch arm;

a second coupling member including locking ramp means for sliding engagement with said latch ramp surface in a direction generally circumferential in respect to an axis of said contacts;

detent means on said locking ramp means for retaining said latch ramp surface adjacent said locking ramp means when said latch ramp surface engages said locking ramp means after at least one of said coupling members is rotated about said axis relative to the other of said coupling members;

wherein each of said coupling members includes a central bore, each bore including contact retaining means comprising an elastically deformable surface of said bore which slopes radially inward and ends in an elastically deformable detent, for retaining a respective one of said cable contacts, said retaining means elastically deforming as a radially outwardly extending collar member on said respective one of said contacts passes said detent during insertion of said respective contact into a respective coupling member, and engaging said collar member after passage of said collar member past said detent, upon restoration of said contact retaining means to a shape which it possessed before insertion of the respective contact, to thereby secure said respective contact in said bore.

2. An arrangement as claimed in claim 1, wherein said latch arm comprises an arm extending from a main body of said first coupling member generally in a direction parallel to said axis, a distal end of said arm forming a projection which extends radially inward in respect to said axis, said latch arm ramp surface including a surface of said projection which faces an interface between said coupling members, and said locking ramp means including a locking ramp surface which extends around a periphery of said second coupling member and faces away from said interface.

3. A coupler as claimed in claim 1, further comprising a second latch arm on said first coupling member and a second locking ramp means on said second coupling member, wherein said second latch arm and second locking ramp means are identical to and symmetrical about said axis relative to said first latch arm and first locking means.

4. An arrangement as claimed in claim 1, wherein said first and second coupling members are identical to each other.

5. A coupler as claimed in claim 1, wherein said contacts comprise a pin and a socket.

6. A coupler as claimed in claim 1, wherein said contacts are twinax contacts.

7. An arrangement as claimed in claim 1, further comprising means for environmentally sealing said coupler members upon coupling.

8. A coupler as claimed in claim 7, further comprising means comprising an axially centered groove in a surface of each coupling member for retaining an o-ring seal between respective cable contacts and said coupling members.

9. A method of coupling contacts, comprising the steps of:

(a) snap-locking one of two coupling members onto a first cable contact upon insertion of said contact through a bore in said coupling member until a collar member on said first cable contact causes a ramp surface of said bore to elastically deform, thereby permitting said collar member to pass a detent at the end of said ramp surface, at which time the ramp surface and detent are restored to a shape possessed prior to insertion of the first cable contact, said detent engaging said collar member to hold said collar member against a shoulder provided in said bore, thereby retaining said first cable contact in said coupling member;

(b) moving said coupling member towards a second indentical coupling member including a second cable contact until facing interface surfaces of each of said coupling members contact each other; and (c) rotating said coupling members relative to a common axis such that a latching arm on one coupling member rides over a detent on the other coupling member and engages a locking surface on the other coupling member, thereby locking said first cable contact and said second cable contact together against relative axial movement.

10. A method as claimed in claim 9, wherein said coupling members are rotated up to 75° relative to each other during the performance of step (c).

11. A method as claimed in claim 9, further comprising the step of aligning said locking latch with a corresponding groove on the other of said two coupling members prior to step (b).

* * * * *